United States Patent [19]
Tabei

[11] Patent Number: 4,583,143
[45] Date of Patent: Apr. 15, 1986

[54] WIRING FOR THIN FILM MAGNETIC HEAD

[75] Inventor: Masatoshi Tabei, Kanagawa, Japan

[73] Assignee: Fuji Photo Film Co., Ltd., Kanagawa, Japan

[21] Appl. No.: 494,474

[22] Filed: May 13, 1983

[51] Int. Cl.⁴ .............................................. G11B 5/20
[52] U.S. Cl. .................................... 360/123; 360/125
[58] Field of Search ............... 360/110, 123, 125, 126, 360/127

[56] References Cited

U.S. PATENT DOCUMENTS 4,353,102 10/1982 Kanai et al. ..................... 360/125 X
4,423,451 12/1983 Chi .................................. 360/121 X Primary Examiner—John H. Wolff
Attorney, Agent, or Firm—Sughrue, Mion, Zinn, Macpeak, and Seas

[57] ABSTRACT

A wiring configuration for thin film magnetic recording and reproducing heads. The inside end of the windings of the thin film magnetic recording head extends through an insulator to contact a bottom permalloy layer. A source of driving current is connected through a first conductor to the bottom permalloy layer and through a second conductor to the outside end of the windings. Thus, the windings of the thin film magnetic recording head are driven without the use of an overpass conductor. The bottom permalloy conductor can be divided so that the magnetic core formed by a first portion of the permalloy layer and the pole piece is insulated from a second portion of said bottom permalloy layer which receives the driving current.

5 Claims, 5 Drawing Figures

WIRING FOR THIN FILM MAGNETIC HEAD

BACKGROUND OF THE INVENTION

This invention relates generally to the field of magnetic recording and reproduction, and more specifically to a wiring arrangement for driving a pancake-wound spiral conductor of a thin film magnetic read/write head.

In general, the use of thin film magnetic elements is well known in the magnetic recording art. Such a thin film magnetic read/write head is shown in FIGS. 1 and 2 (prior art), corresponding to FIGS. 1 and 2 of U.S. patent application Ser. No. 313,841, assigned to the same assignee as the present application. The thin film recording head 10 comprises a bottom conductor layer 20 formed on a substrate 30, with a first insulator layer 60a deposited on the first conductor layer 20. Windings 40 are disposed on top of the first insulator layer 60a, and a second insulator layer 60b is disposed on top of windings 40. A pole piece 50 is then provided to the upper surface of the second insulator layer 60b such that one end 56 of pole piece 50 is separated from conductor layer 20 by the first insulator layer 60a to form an air gap 52. The pole piece 50 extends over one side of the windings 40 such that the second end 54 of the pole piece 50 directly contacts the bottom conductor layer 20 at the axial center of the windings 40. An overpass conductor 46 connects the inner end of the windings 40 to a first connecting pad 42. A second conductor 48 connects the outer end of the windings 40 to a second connecting pad 42'. The connecting pads 42, 42' are in turn connected to current drivers 44, 44', respectively. In operation, current from the current drivers flows through the windings 40 to produce a magnetic field at the above-mentioned gap 52. The produced magnetic field serves to record magnetic spots on a magnetic tape or other such recording medium 70. In a reverse manner the read/write head operates to read magnetic data previously recorded on recording medium 20.

The formation of the thin film head of FIGS. 1 and 2 may be described in more detail as follows: A silicon or ceramic substrate 30 is coated with a first conductor layer 20 which consists of a permalloy [NiFe] magnetic material. A first insulating layer 60a of silicon dioxide is then formed on the permalloy layer 20. Next, aluminum (or other conductors such as Au, Ag, or Cu) is deposited and patterned into windings 40. The windings 40 are covered by a second silicon dioxide insulating layer 60b. The overpass conductor 46 typically comprises either the same materials as the windings 40 or permalloy, as discussed in *IBM Disk Storage Technology*, February 1980, page 7. Although the overpass conductor in FIG. 2 is disposed beneath the second insulating layer 60, in some prior art thin film devices the overpass conductor is provided on the upper surface of the second insulating layer 60. In addition, a second pattern winding may be provided. For example, IBM produces a recording head using two layers of windings with four turns per layer, and "DASTEK" makes an improved recording head having five turns in one layer and four turns in another layer. Although the present invention will be described with reference to one layer of windings, it is to be understood that the invention is not to be limited thereto. After formation of the windings 40, the pole piece 50 is formed of permalloy and is situated so that one of its ends 54 contacts the bottom permalloy layer 20 and its other end 56 is separated from the bottom permalloy by the first insulating layer 60a in order to provide a recording gap 52.

With the overall trend towards miniaturization, a need has developed for the above-described thin film magnetic read/write head to be reduced in size. One method of reducing the size of a thin film device is to eliminate one or more of the layers coated on the substrate. However, in the prior art, no one has developed a structure or method by which the layers of thin film magnetic read/write head could be removed or eliminated without rendering the device inoperative for its intended purpose.

SUMMARY OF THE INVENTION

It is thus an object of the present invention to eliminate at least one of the layers deposited or provided on the substrate of a thin film magnetic read/write head, to reduce the overall thickness of the device.

It is another object of the invention to reduce the number of process steps necessary in order to manufacture a thin film magnetic read/write head.

It is a further object of the invention to simplify the structure of a thin film magnetic read/write head.

These and other objects of the invention are realized by eliminating the overpass permalloy conductor which connects the inside end of the windings to the current driver. A direct electrical contact is established between the bottom permalloy layer and the inside end of the windings. The current driver is directly connected to the bottom permalloy layer. Thus, an electrical contact is established between the winding and the current driver without the need for incorporating an overpass permalloy conductor. Further, in order to isolate the electrically driven portion of the windings from the magnetic field producing side of the windings, the bottom permalloy layer can be cut so that the electric potential of the bottom permalloy layer does not interfere with the magnetic flux at the recording gap.

BRIEF DESCRIPTION OF THE DRAWINGS

The foregoing and other aspects of the invention will become apparent upon a detailed description of the preferred embodiments thereof. In the description to follow, reference will be made to the accompanying drawings, in which.

DETAILED DESCRIPTION OF THE PREFERRED EMBODIMENTS

Figure 1:
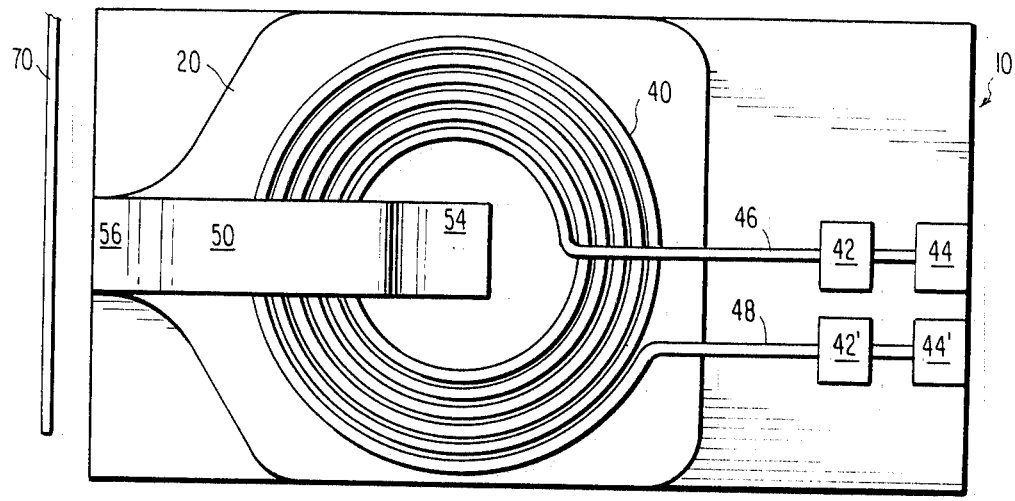
FIG. 1 is a top view of a prior art thin film recording head.
Figure 2:
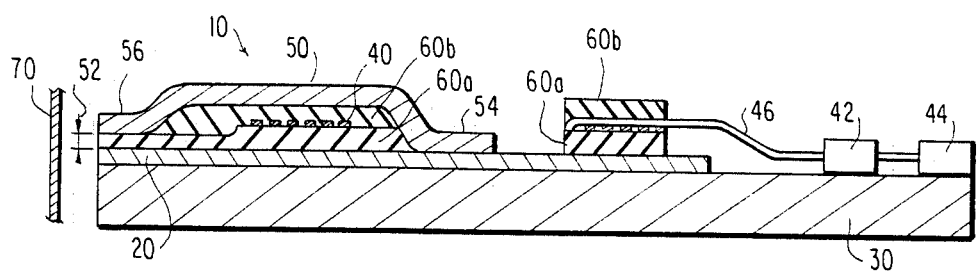
FIG. 2 is a cross-sectional view of the thin film recording head of FIG. 1.
Figure 3:
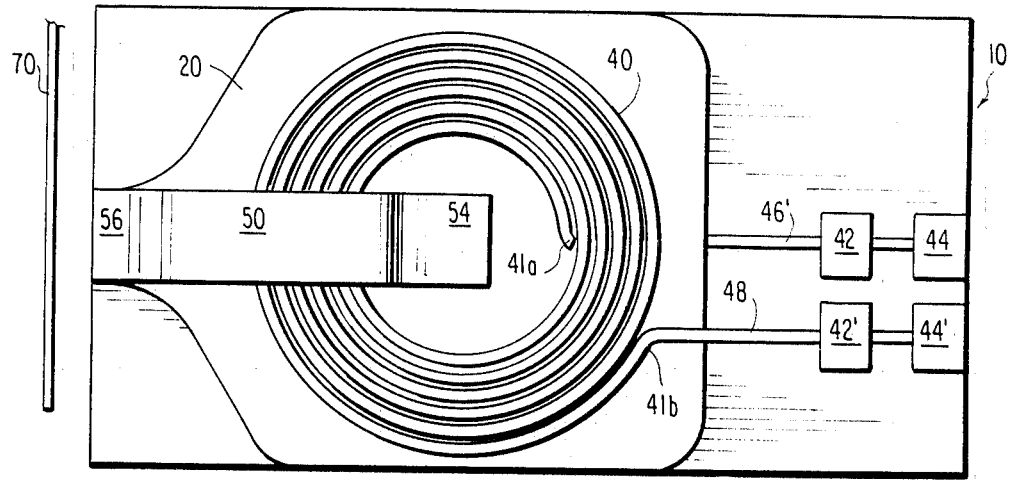
FIG. 3 is a top view of a thin film recording head according to a first embodiment of the present invention.
Figure 4:
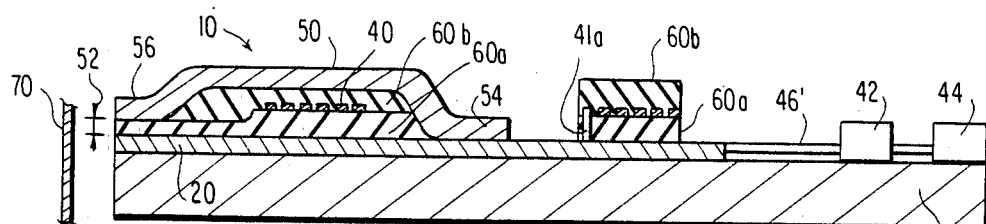
FIG. 4 is a cross-sectional view of the thin film recording head of FIG. 3.

A first embodiment of the invention will be described with reference to FIGS. 3 and 4, in which like reference numerals denote similar structures. A bottom permalloy layer 20 is disposed on one surface of a substrate 30. A first insulating layer 60a is disposed on the upper surface of bottom permalloy layer 20. A plurality of windings 40 are then deposited on the upper surface of the first insulating layer 60a to define a pancake coil thereon, and a second insulating layer 60b is deposited on the windings 40. A permalloy pole piece 50 is disposed on the upper surface of the second insulating layer 60b so that one end 54 of pole piece 50 contacts permalloy layer 20 at the axial center of the windings 40, and that the other end 52 of pole piece 50 is separated from permalloy layer 20 by an air gap 52 defined by the thickness of the first insulating layer 60a. The differences between the first embodiment of the invention as shown in FIGS. 3 and 4 and the thin film magnetic recording head of the prior art as shown in FIGS. 1 and 2 reside in the wiring connection between the windings 40 and the current drivers 44, 44'. As shown most clearly in FIG. 4, the inside end 41a of the windings 40 extends through the first insulating layer 60a to establish a direct electrical contact between the winding 40 and the bottom permalloy layer 20. The bottom permalloy layer 20 is connected to current driver 44 through a conductor 46' and pad 42. Note that the conductor 46' is connected to the outside end of bottom permalloy layer 20; that is, conductor 46' does not add to the thickness of the thin film magnetic recording head as did the overpass conductor of the prior art. In this manner, current from the current driver 44 is fed through conductor 46' to the bottom permalloy layer 20, which is in turn directly connected to the inside end 41a of the windings 40. The outside end 41b of the windings 40 is connected through conductor 48 to pad 42, which is in turn connected to current driver 44' (as in the prior art).

The connection between winding 40 and permalloy layer 20 is easy to accomplish. As one example, subsequent to deposition of insulator 60a but prior to depositing and forming a pattern in the metal 40, an opening is made in layer 60 extending down to the permalloy. During metal deposition the metal 41a fills the opening.

Thus, the present invention provides a wiring connection for a thin film magnetic recording head in which the overpass conductor of the prior art can be eliminated. By eliminating the overpass conductor, the thickness of the thin film magnetic recording head is reduced, and the number of process steps necessary to manufacture the thin film recording head is reduced accordingly.

Figure 5:
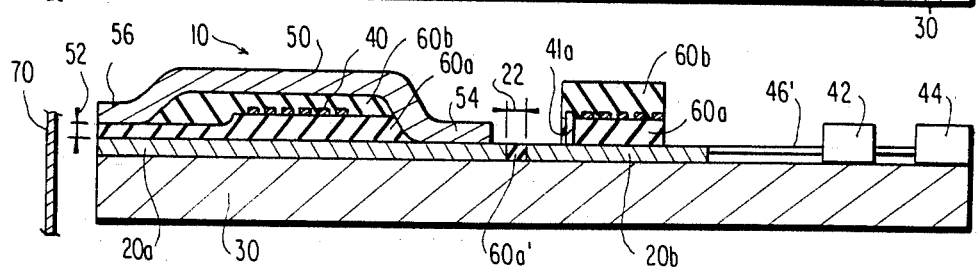
FIG. 5 is a cross-sectional view of a second embodiment of the present invention.

In some recording applications, it may be disadvantageous to provide a current to the bottom permalloy layer, since this layer also serves as one side of a magnetic recording core. In other words, by providing electrical excitation to the bottom permalloy layer, the magnetic flux produced by the magnetic core defined by bottom permalloy layer 20 and pole piece 50 may be adversely affected, even though the air gap therebetween defines a path of greater resistance. Accordingly, in a second embodiment of the invention as shown in FIG. 5, the permalloy layer 20 is divided into a first permalloy layer portion 20a and a second permalloy layer portion 20b. The permalloy layer portions 20a and 20b are separated by a gap 22. When the first insulating layer 60a is deposited on the permalloy layer portions 20a and 20b, a portion 60a' thereof is allowed to settle within gap 22. In this manner, the electrical input function of the winding 40 is separated from the magnetic output function thereof. That is, the insulator portion 60a' disposed between permalloy layer portions 20a and 20b insulates the magnetic core defined by permalloy layer portion 20a and pole piece 50 from the electrical excitation of the windings 40.

In the present invention, therefore, the overpass conductor which connects the inside end of the windings of a thin film magnetic recording head to a current driver is eliminated. It is to be understood that the structure of the present invention is not to be limited to the specific materials delineated. For example, the bottom conductor layer may consist of permalloy or any other material that has similar magnetic and electrical conducting properties. Further, it is to be understood that the technique of eliminating the overpass conductor of thin film magnetic recording heads of the prior art may be used to eliminate unnecessary conductor layers in other thin film electrical devices.

Finally, it is to be understood that modifications can be made to the above-described embodiments of the present invention without departing from the spirit and scope of the appended claims.

I claim:

1. A magnetic recording and reproducing thin film head, comprising:
    a substrate;
    a first conductor layer disposed on a surface of said substrate;
    a first insulating layer disposed on said first conductor layer;
    a second conductor layer disposed on said first insulating layer in the form of a discrete pancake coil of at least one turn defining a coil center, said coil having an inside end and an outside end, said inside end of said coil extending through said first insulating layer to contact said first conductor layer;
    a connecting pad disposed on said substrate and external to the outer periphery of said pancake coil;
    conductor means situated in the plane of said first conductor layer and electrically connected to said first conductor layer and said connecting pad for electrically connecting said inside end of said pancake coil to said connecting pad;
    a second insulating layer disposed on said second conductor layer; and
    a pole piece partially disposed over said second insulating layer, one end of said pole piece being in contact with said first conductor layer at the axial center of said coil, the other end of said pole piece cooperating with said first conductor layer and being separated therefrom by said first insulating layer to define a head gap.

2. The magnetic recording and reproducing thin film head as recited in claim 1, wherein said first conductor layer has first and second portions separated by said first insulating layer, said first portion of said first conductor layer being connected to said conductor means, and said second portion of said first conductor layer being connected to said pole piece.

3. The magnetic recording and reproducing thin film head as recited in claim 1, wherein said first conductor layer is comprised of permalloy.

4. The magnetic recording and reproducing thin film head as recited in claim 1, wherein said pole piece is comprised of permalloy.

5. The magnetic recording and reproducing has as recited in claim 1, further including another connecting pad and another conductor means, said another conductor means electrically connecting the outside end of said coil to said another connecting pad.

* * * * *